United States Patent
Schoneich

(10) Patent No.: US 9,181,976 B2
(45) Date of Patent: Nov. 10, 2015

(54) BEARING SHELL AND METHOD FOR ITS PRODUCTION

(75) Inventor: Guido Schoneich, Ostrich-Winkel (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 2242 days.

(21) Appl. No.: 12/097,401

(22) PCT Filed: Dec. 13, 2006

(86) PCT No.: PCT/DE2006/002237
§ 371 (c)(1),
(2), (4) Date: Jun. 13, 2008

(87) PCT Pub. No.: WO2007/076803
PCT Pub. Date: Jul. 12, 2007

(65) Prior Publication Data
US 2008/0267546 A1 Oct. 30, 2008

(30) Foreign Application Priority Data
Dec. 13, 2005 (DE) .......................... 10 2005 060 637

(51) Int. Cl.
*F16C 33/14* (2006.01)
*F16C 33/08* (2006.01)
*F16C 17/02* (2006.01)

(52) U.S. Cl.
CPC ................ *F16C 17/02* (2013.01); *F16C 33/08* (2013.01); *F16C 33/14* (2013.01)

(58) Field of Classification Search
USPC ......... 384/271–273, 275, 276, 283, 284, 295, 384/129; 474/231; 29/898.056, 898.063; 192/110 B
IPC .............................................. F16C 33/02,33/08
See application file for complete search history.

(56) References Cited

U.S. PATENT DOCUMENTS

| | | | |
|---|---|---|---|
| 1,116,065 A | * | 11/1914 | Hotchkiss ...................... 384/272 |
| 1,759,906 A | * | 5/1930 | Kerruish .................. 29/898.056 |
| 1,925,055 A | | 8/1933 | Mize |
| 2,624,105 A | | 1/1953 | Virtue |
| 2,883,738 A | | 4/1959 | Morrow |
| 3,040,428 A | | 6/1962 | Sundholm |
| 3,216,305 A | * | 11/1965 | Kaplan et al. ................... 411/58 |
| 4,486,104 A | * | 12/1984 | Vezirian et al. ................. 384/95 |
| 2004/0208407 A1 | | 10/2004 | Wenz |

FOREIGN PATENT DOCUMENTS

| | | |
|---|---|---|
| CH | 231312 | 3/1944 |
| CH | 345206 A | 3/1960 |
| DE | 2145759 | 3/1973 |
| DE | 86 05 148 U1 | 6/1986 |
| DE | 19828847 A1 | 2/2000 |
| EP | 1070873 A1 | 1/2001 |

* cited by examiner

*Primary Examiner* — Daniel Yabut
(74) *Attorney, Agent, or Firm* — Robert L. Stearns; Dickinson Wright, PLLC

(57) ABSTRACT

The invention provides a bearing sleeve and method of forming a sleeve having at least one window whose edge boundary has a first apex region and a second apex region situated opposite one another in the sleeve longitudinal direction. In order to prevent chip formation when pressing the bearing sleeve into a bearing housing, it is provided that, in at least one apex region, the edge boundary forms an angle $\alpha \neq 90°$ with the sleeve longitudinal direction of the bearing sleeve.

5 Claims, 5 Drawing Sheets

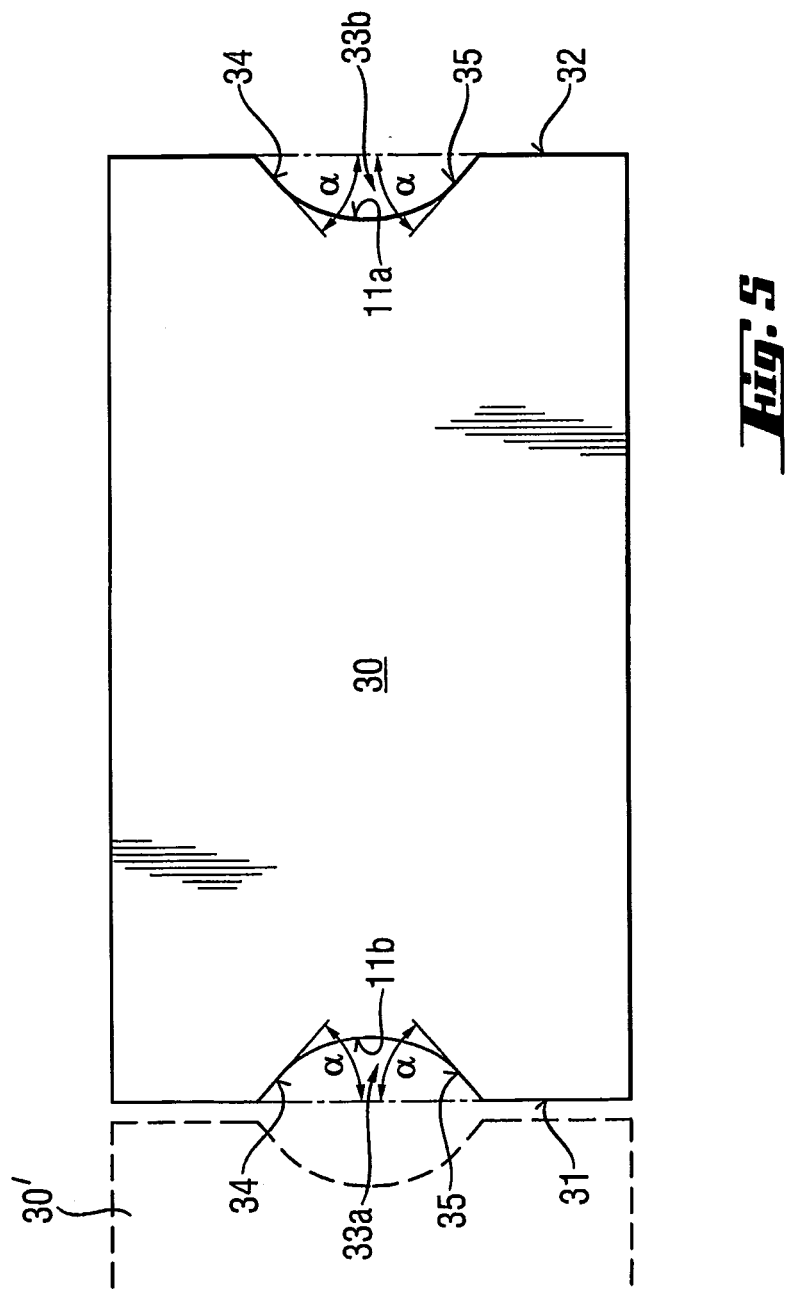

BEARING SHELL AND METHOD FOR ITS PRODUCTION

CROSS REFERENCE TO RELATED APPLICATION

Figure 1:
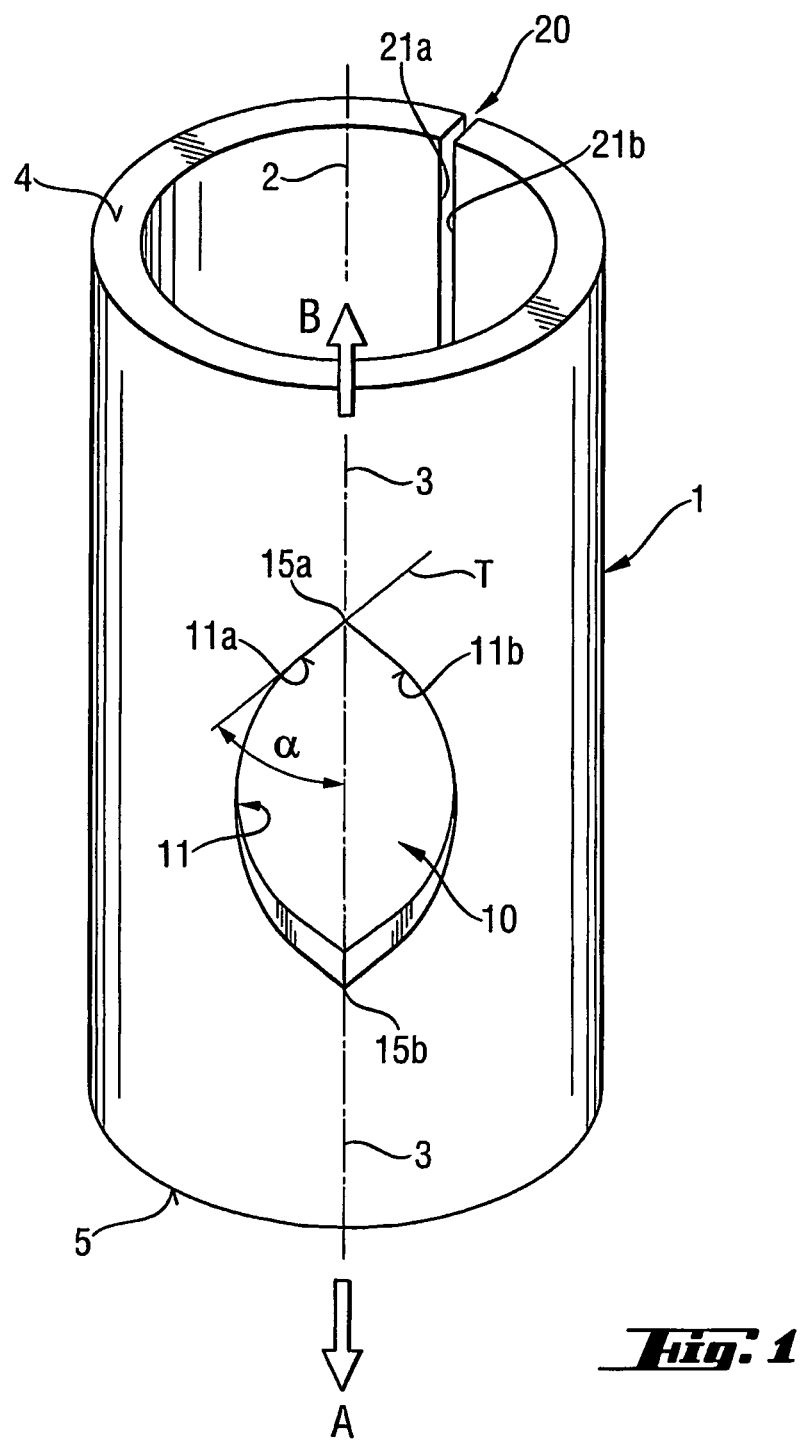

This application is a U.S. national phase application under 35 U.S.C. §371 of International Application No. PCT/DE06/02237 filed Dec. 13, 2006, which claims priority to DE 10 2005 060 637.7 filed Dec. 13, 2005, both of which are herein incorporated by reference in their entirety.

BACKGROUND OF THE INVENTION

1. Technical Field

The invention relates to a bearing bush having at least one aperture whose edge boundary has a first apex and a second apex situated opposite one another in the bush longitudinal direction. The invention further relates to a particular use of said bearing bush, and a manufacturing method.

2. Related Art

Such bearing bushes are used, for example, in brake calipers of motor vehicles. For a combined parking brake-service brake, the bearing bush must have at least one aperture through which a corresponding pin may engage in the bush when the parking brake is actuated.

When these bushes are incorporated into the housing, which may be made of aluminum, for example, the sharp-edged boundary of the aperture may produce chips which may impair the function of the bearing. This drawback occurs in particular for bearings having a butt edge, since when the bushing is pressed in, partial surfaces of the bearing on one side are compressed, and on the opposite side are spread apart. As a result of this deformation of the bearing bush, chip formation is facilitated in particular when the aperture is located in the region of the partial surfaces.

SUMMARY OF THE INVENTION

The object of the invention, therefore, is to provide a bearing bush having an aperture, for which no chip formation occurs when the bearing bush is incorporated into a bearing housing made of a softer material.

This object is achieved by use of a bearing bush, characterized in that the edge boundary in at least one apex forms an angle $\alpha \neq 90°$, preferably $\alpha < 90°$, with respect to the longitudinal direction of the bush.

Pressing in the bearing bush causes chip formation, in particular in the rear section of the edge boundary in the insertion direction. When, in only a single apex region, the edge boundary of the aperture has no sections which form an angle $\alpha = 90°$ with respect to the longitudinal direction, i.e., is perpendicular to the longitudinal direction, the insertion direction must be taken into account when the bearing bush is pressed in. Since even slight deviations from 90° are sufficient to reduce or prevent chip formation, the design of the aperture according to the invention for installation generally is not readily apparent. In order to make the mounting direction apparent in such cases, supplementary measures such as marking the bush, etc. may be practical.

To avoid these supplementary measures, it is advantageous when the edge boundary of the aperture forms an angle $\alpha \neq 90°$ with respect to the longitudinal direction of the bush in all sections. The bush may be pressed into the housing in both insertion directions without the formation of chips.

The angle $\alpha$ is preferably selected as follows:
$45° < \alpha < 90°$, in particular $60° < \alpha < 90°$, and
$45° < \alpha < 85°$, in particular $60° < \alpha < 85°$.

The aperture may have a circular, oval, or polygonal design.

The aperture preferably tapers in the longitudinal direction in at least one apex, and the edge boundary advantageously tapers off in the apex region. At the tip, due to unavoidable rounding the edge boundary at one point necessarily has an angle $\alpha = 90°$. However, such infinitesimal regions are negligible. It is important that no sections of the edge boundary of greater length are perpendicular to the longitudinal axis.

The aperture is generally circular, since as a rule circular pins are intended to engage in the bush. The circular contour may be maintained when, on at least one apex region, the circular contour is interrupted by an edge boundary which is not perpendicular to the longitudinal direction. It is therefore advantageous when the aperture has a triangular section in the edge boundary for the apex region in question.

The aperture is preferably situated in the region of the partial surfaces. In this embodiment the aperture is preferably formed by two identical recesses in the narrow side of the plate, which is deformed, in particular rolled, with respect to the bearing bush. This embodiment has advantages from a manufacturing standpoint, since the recesses may also be applied when the plates are separated.

In the method for manufacturing a bearing bush having at least one aperture whose edge boundary has a first apex region and a second apex region situated opposite one another in the bush longitudinal direction, wherein the edge boundary forms an angle $\alpha \neq 90°$ with respect to the longitudinal direction of the bearing bush at least in one apex region, plates are separated from a strip material,
when the plates are separated at the sides of the plates forming the butt joint of the bearing bush, in each case at least one recess is punched out which forms the angle $\alpha$ with respect to the plate side(s) at least one end section, and
the plates are subsequently rolled into bushes, and the recesses introduced at the sides of the plates together form at least one aperture at the butt joint.

The cutting of the plate to length and the punching out of the recesses may be performed at the same time. However, it is also possible to first punch out the aperture from the strip material, and then cut the plates to length in the region of the aperture.

One preferred use of the bearing bush is for the bearing of eccentric shafts for combined parking brake-service brakes in motor vehicles. Combined parking brake-service brakes (combination calipers) are used in disk brakes.

THE DRAWINGS

Figure 2:
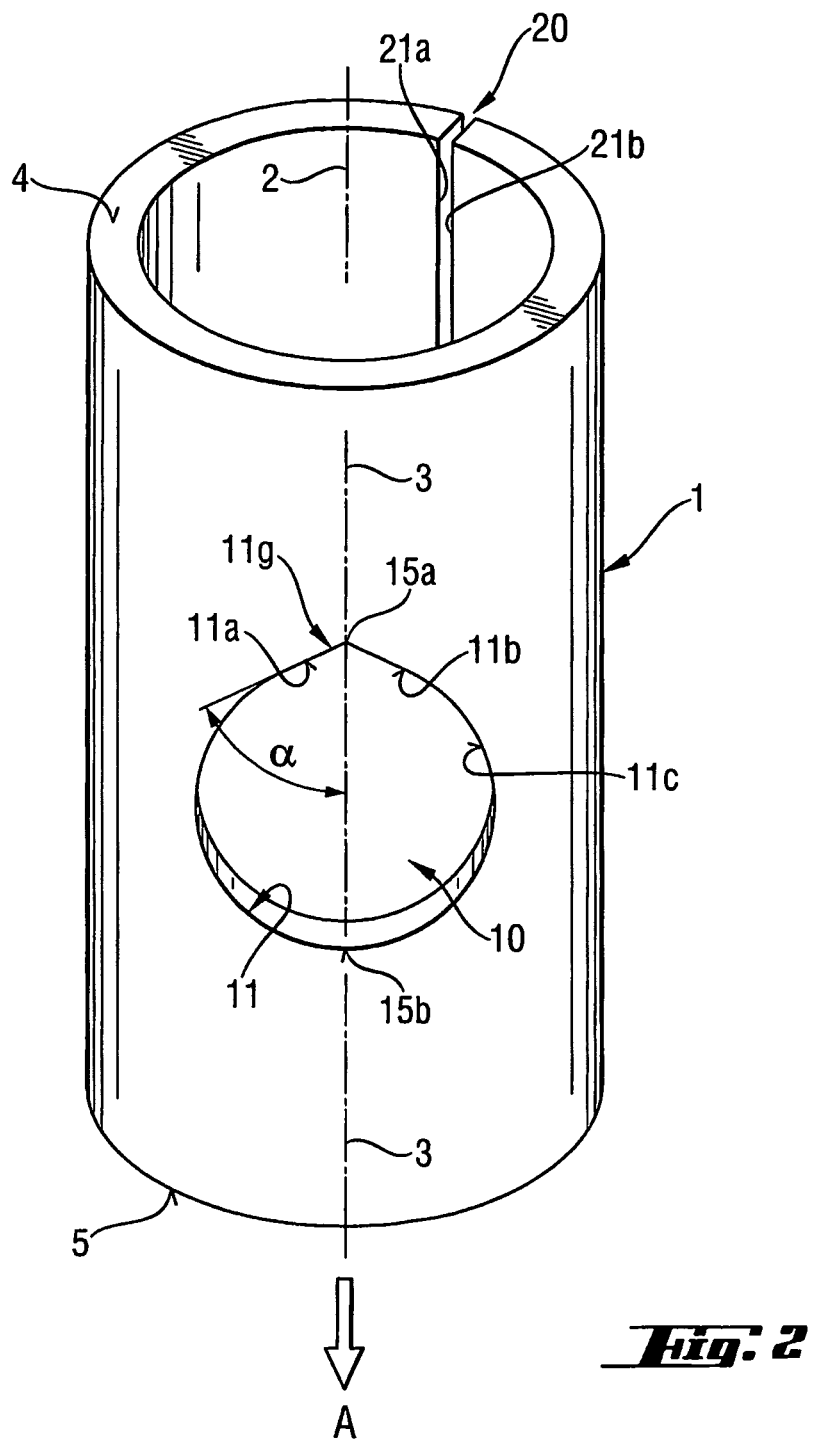
Figure 3:
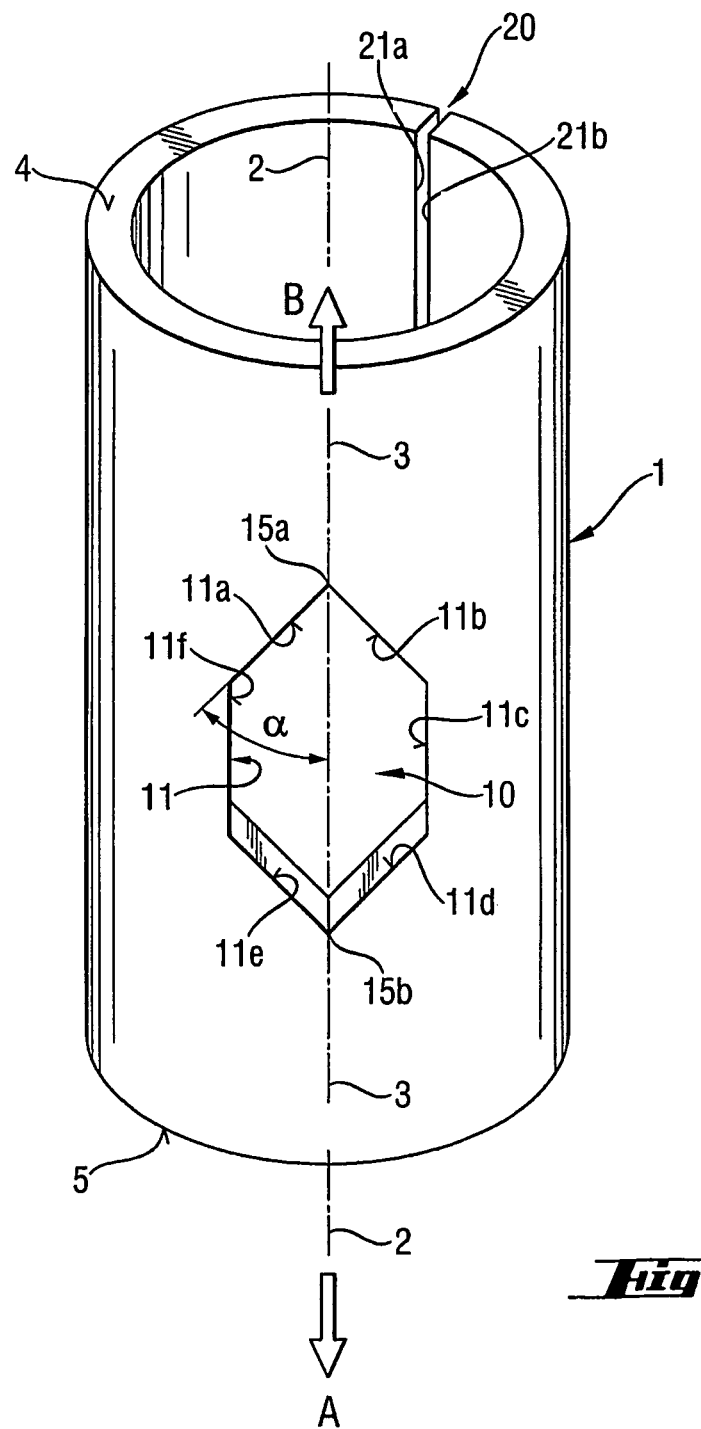
Figure 4:
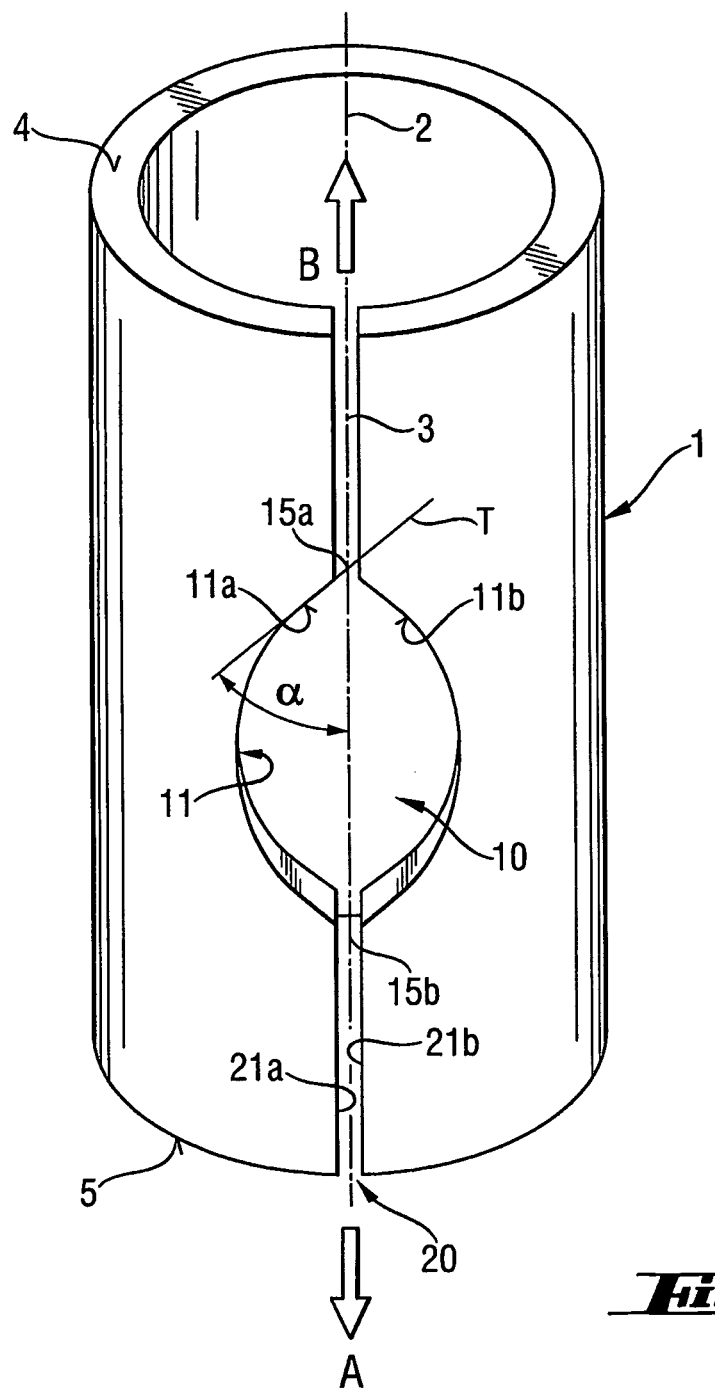

Exemplary embodiments of the invention are explained in greater detail below with reference to the drawings, which show the following:

FIGS. 1 through 4 show perspective illustrations of bearing bushes according to various embodiments; and FIG. 5 shows a plate for manufacturing a bearing bush according to FIG. 4.

DETAILED DESCRIPTION

FIG. 1 shows a perspective illustration of a bush or sleeve 1 having a butt joint 20 and partial surfaces 21a, 21b. The bush 1 also has at any given location a closed aperture or window 10 having an approximately oval edge boundary 11.

The aperture 10, viewed in the longitudinal direction 3, is centrally positioned in the bush 1. However, the aperture 10 may also be located at any other given position, and may extend, for example, to the end faces 4 or 5. In that case, the aperture 10 would have a partially open design on the side.

The edge boundary 11 has two curved sections 11a, 11b which both taper toward one another into apex regions 15a, 15b situated in the longitudinal direction 3. The particular angle α between the tangent T to the edge boundary 11a and the longitudinal direction 3 is approximately 50° in the embodiment shown here. The aperture 10 likewise tapers in insertion direction A and in insertion direction B, indicated by the respective arrows. This bearing bush 10 has the advantage that it can be pressed or pushed, in both direction A and direction B, into the bearing housing without chips being produced through the aperture 10 when the bearing bush is inserted into the bearing housing.

If the apexes 15a, 15b in the transition of the boundary sections 11a, 11b contain infinitesimal curvatures which in places are perpendicular to the longitudinal axis, no chips are thus produced.

FIG. 2 shows a further embodiment having a circular section 11c. In the apex region 15a this circular contour of the edge boundary 11c merges into two approximately linear sections 11a, 11b which taper toward one another to the apex 15a, and thus have no section that is perpendicular to the longitudinal direction 3. The two linear sections 11a, 11b together form the gabled contour 11g. Since such a contour 11g is absent in the apex region 15b, the bearing bush 1 must be inserted into the bearing housing in direction A to avoid chip formation.

FIG. 3 illustrates a further embodiment of a bearing bush 1 in which the aperture 10 has a hexagonal design. The edge boundary 11 comprises linear sections 11a through 11f. The edge boundary sections 11a, 11b and 11d, 11e taper toward one another into apex regions 15a, 15b, respectively, so that in this embodiment the angle α is 45°.

FIG. 4 illustrates a further embodiment of a bearing bush 1 having an aperture 10 with a design corresponding to the edge boundary 11 in FIG. 1, except that the aperture 10 is situated in the region of the partial surfaces 21a, 21b. The aperture 10 is formed by two equally-sized recesses which are punched out in the end regions of the plate, and is thus formed in the region of the butt joint 20 after the bush is roll-formed.

As shown in FIG. 5, corresponding recesses 33a, b may be introduced at the narrow ends or sides 31, 32 of the plate 30 from which the bearing bush 1 is manufactured. The recesses have end sections 34, 35 contiguous to the plate sides 31, 32 which form the narrow sides of the plate 30, 30'. These end sections 34, 35 together with the plate sides 31, 32 form the angle α, which is less than 90°. FIG. 5 also shows the plate 30' in dashed lines, indicating that the plate is separated from a strip material. The plate 30 may be separated in the same process step as the introduction of the recess 33a, so that an additional process step is not necessary to produce the aperture 10.

The invention claimed is:

1. Bearing bush comprising:
   a bearing bush of eccentric shafts adapted for cooperation with a combined parking brake-service brake in motor vehicles, the bearing bush comprising
   at least one aperture whose edge boundary has a first apex region and a second apex region situated opposite one another in the bush longitudinal direction,
   wherein the edge boundary in at least one apex region forms an angle 60°<α<90° with respect to the longitudinal direction of the bearing bush, wherein the edge boundary comprises two approximately linear sections which taper towards one another to the apex.

2. Bearing bush according to claim 1, wherein the entire edge boundary of the aperture forms an angle α≠90° with respect to the longitudinal direction of the bearing bush.

3. Bearing bush according to claim 1, wherein the edge boundary of the aperture has at least one circular section, and in at least one apex region has a gabled section.

4. Bearing bush according to claim 1, including partial surfaces and a butt joint, wherein the aperture is disposed in the region of the partial surfaces.

5. Bearing bush according to claim 1, wherein the edge boundary forms an angle 60°<α<85° with respect to the bush longitudinal direction.

* * * * *